Figure 1:
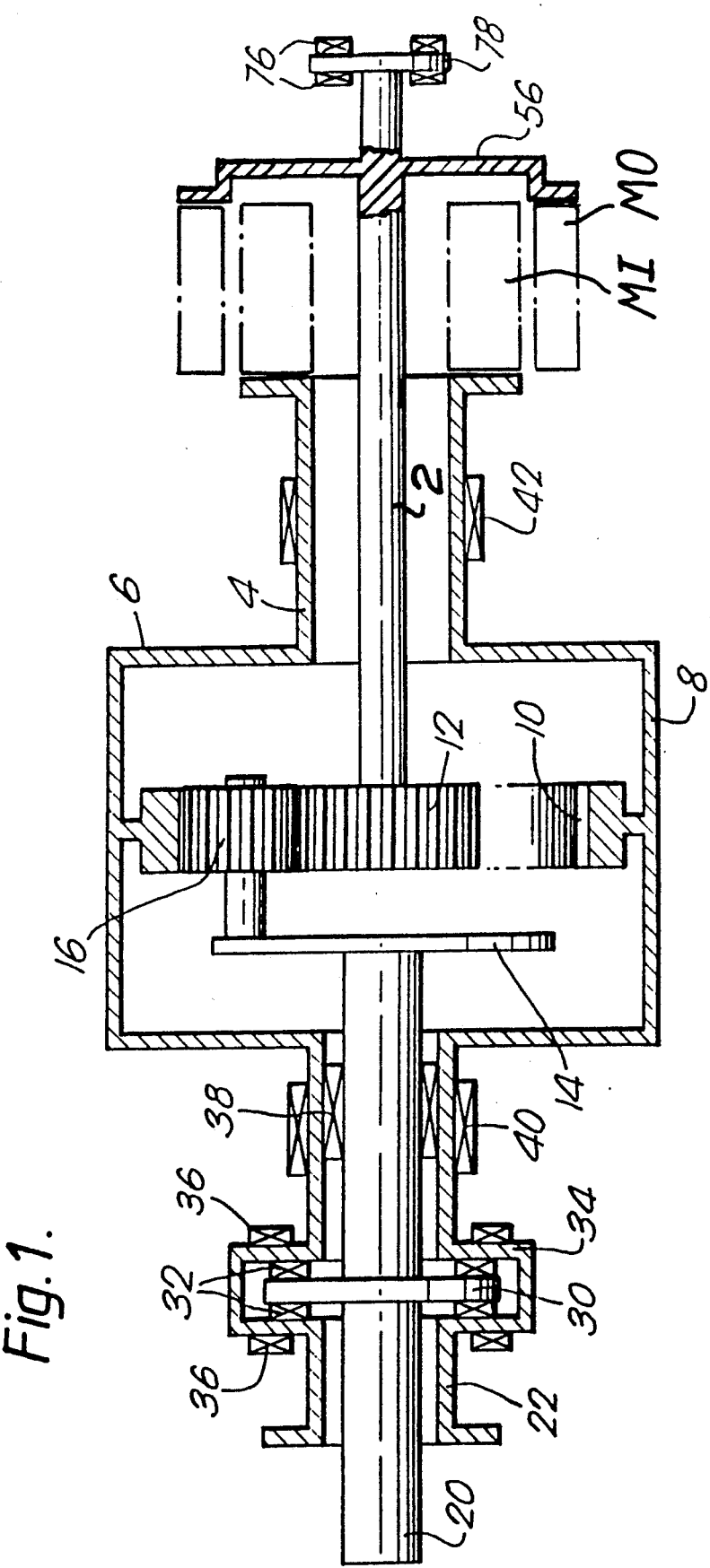

United States Patent [19]

Yates et al.

[11] Patent Number: 5,087,230
[45] Date of Patent: Feb. 11, 1992

[54] DRIVE TRANSMISSIONS

[75] Inventors: David E. Yates; Geoffrey J. Lack; Alan De Ville, all of Worcester, England

[73] Assignee: Northern Engineering Industries plc, Newcastle Upon Tyne, England

[21] Appl. No.: 595,999

[22] Filed: Oct. 11, 1990

[30] Foreign Application Priority Data

Oct. 23, 1989 [GB] United Kingdom ................ 8923784

[51] Int. Cl.⁵ ............................ B63H 5/10; F16H 3/60
[52] U.S. Cl. ..................................... 475/151; 475/331; 475/1; 440/80; 440/81; 310/115
[58] Field of Search .................... 440/80, 81; 310/115, 310/116; 475/1, 6, 151, 331

[56] References Cited

U.S. PATENT DOCUMENTS

| | | | |
|---|---|---|---|
| 1,348,539 | 8/1920 | Breitenbach | 310/115 |
| 1,351,999 | 9/1920 | Heath | 310/115 |
| 2,149,785 | 3/1939 | Neugebauer | 475/1 X |
| 2,462,182 | 2/1949 | Guerdan et al. | 310/115 |
| 3,083,312 | 3/1963 | Moore | 310/115 |
| 3,688,732 | 9/1972 | Singelmann et al. | 440/80 X |

FOREIGN PATENT DOCUMENTS

| | | | |
|---|---|---|---|
| 1179163 | 5/1959 | France | 475/1 |
| 60-213598 | 10/1985 | Japan | 440/81 |
| 61-071297 | 4/1986 | Japan | 440/80 |
| 62-244791 | 10/1987 | Japan | 440/81 |
| 62-247996 | 10/1987 | Japan | 440/81 |
| 2557 | of 1894 | United Kingdom | 310/115 |
| 2136084 | 9/1984 | United Kingdom | |

Primary Examiner—Leslie A. Braun
Assistant Examiner—Matthew Stavish
Attorney, Agent, or Firm—Cushman, Darby & Cushman

[57] ABSTRACT

In a ships drive transmission, contra rotating propeller shafts are driven by powered means comprising concentric contra rotating drive elements, one of the shafts being connected thereto via epicyclic gearing. The propeller shafts are also coupled to each other through a part of the epicyclic gearing, to ensure equal loading.

8 Claims, 2 Drawing Sheets

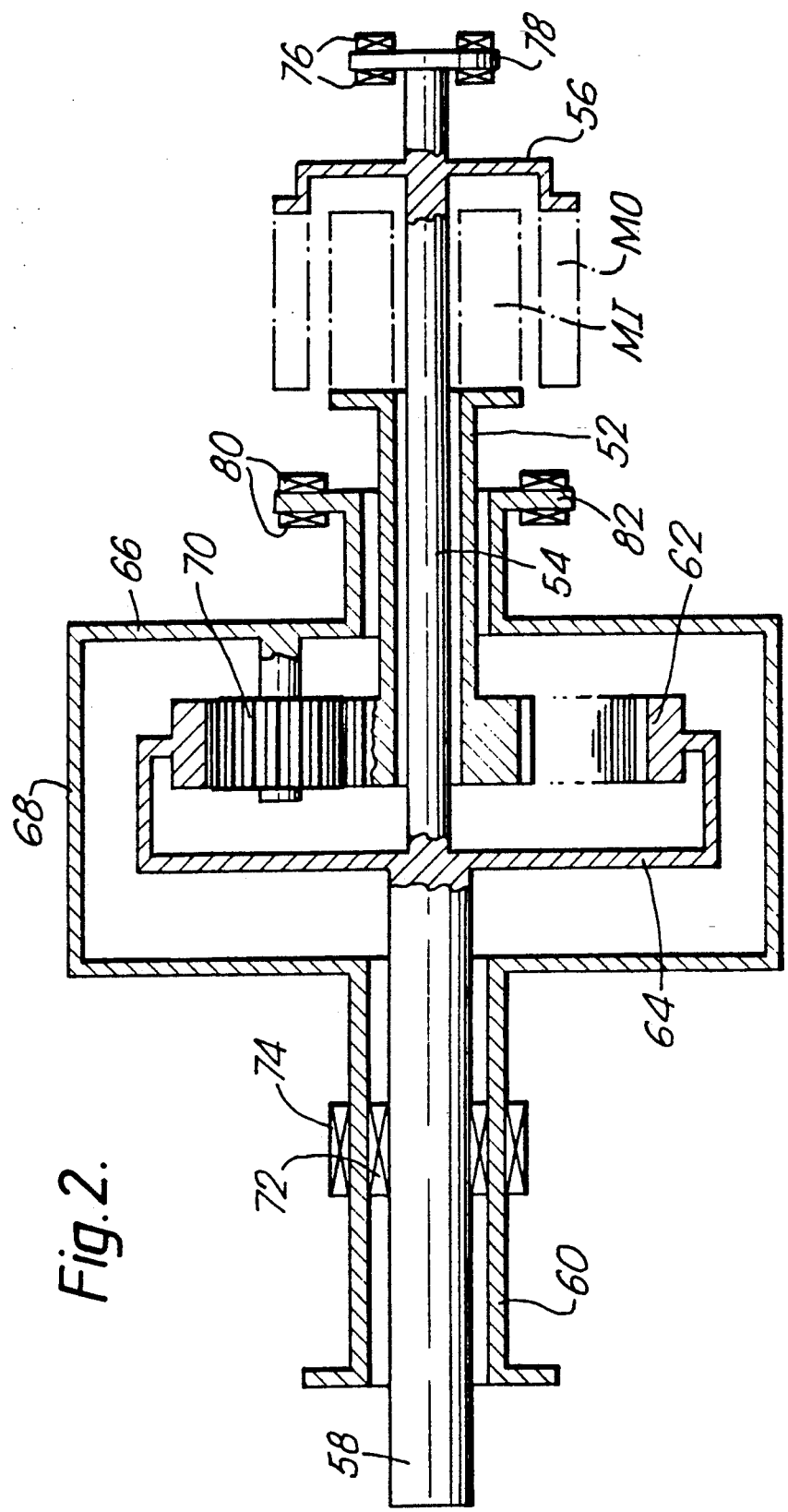

DRIVE TRANSMISSIONS

This invention relates to drive transmissions for driving a pair of contra-rotating shafts from contra-rotating input drives, such as an electric motor having concentric contra-rotating inner and outer elements. It is concerned particularly, but not necessarily exclusively, with drives for contra-rotating marine propellers.

According to one aspect of the invention, there is provided a drive transmission for driving a pair of contra-rotating shafts from an input drive having concentric and contra-rotating inner and outer drive elements, said transmission comprising an epicyclic gear arranged to effect a speed reduction between the contra-rotating inputs and the contra-rotating outputs.

In our earlier patent application Ser. No. 07/517,807 filed May 2, 1990, there are such drive transmissions described. The present invention is especially concerned with further transmissions of this form in which the transmission comprises a single epicyclic gear and in which one of the input drives is connected directly to one of the output shafts, said input drive being also connected directly to an element of the epicyclic gear. Included within the scope of the invention, however, are transmissions with more than one epicyclic gear as described in the earlier application.

Of the three basic elements that form an epicyclic gear, namely sunwheel, annulus and planet carrier with attached plant wheels that mesh with the sunwheel and annulus, said one input drive is preferably directly connected to the annulus. In such an arrangement the other input drive can be connected directly to the sunwheel and the other output shaft is united directly by the planet carrier. This configuration is particularly suitable for such purposes as marine drives, since both output shafts are then driven with a speed reduction.

Axial thrusts on the output shafts can be supported by bearing means disposed on the output side of the epicyclic gear. In an alternative arrangement, however, the output shaft connected directly to its drive element can have the axial thrust on it supported by bearing means that are located on the side of the drive means remote from the output shafts and epicyclic gear.

By way of example, two embodiments of the invention will be described in more detail with reference to FIGS. 1 and 2 on the accompanying schematic drawings, which each show a drive transmission in longitudinal section.

In the drive transmission of FIG. 1 there is an inner input shaft 2 coupled to the inner rotary element of a contra-rotating electric motor (not shown) and a hollow further input shaft 4 concentric with the first shaft and coupled to the outer rotary element of the motor. The drive motor will be independently supported on a fixed mounting, with rotary bearings for both rotary elements maintaining them concentric on that mounting.

The hollow shaft 4 is integral with a cage 6 having a cylindrical portion 8 to which an annulus 10 of an epicyclic gear is secured. The inner input shaft 2 carries the sunwheel 12 of the gear. The gear also has a planet carrier 14 with planet wheels 16 that connect the annulus and sunwheel, the carrier being secured to an inner output shaft 20. A second hollow output shaft 22 concentric with the inner shaft is secured to the cage 6 and is thus intregral with the input shaft 4 and the annulus 10.

The rates of rotation of the two contra-rotating elements of the drive motor are inter-dependent by virtue of the epicyclic planet wheel connection between the annulus and the sunwheel secured to the respective shafts 2, 4 that rotate with the motor rotary elements. These rates of rotation are in turn dependent on the loads on the two output shafts so that the relative speeds of the output shafts will be determined by the sharing of the total torque between them. By virtue of the inter-connection provided by the epicyclic gear, in the dynamic system of the drive that comprises the drive motor, epicyclic gear and output shafts the torques are shared in a self-balancing manner. That is to say the drive system operates without producing any net external torque.

In a manner similar to that described in certain of the embodiments of our earlier application 89.16979, the inner output shaft 20 carries a flange 30 to support the shaft axially through opposite thrust bearings 32 that run on opposite side faces of a collar 34 integral with the outer output shaft 22. Further thrust bearings 36 on the outer faces of the collar 34 transmit axial loads from both shafts 20, 22 to stationary supports (not shown). Inner and outer radial bearings 38, 40, similarly reacting against stationary supports (not shown) engaging the outer bearing 40, ensure coaxiality of the inner and outer output shafts 20, 22.

In use as a drive for contra-rotating marine propellers, the output shafts 20, 22 will be integral with or connected to the propeller shafts, which will themselves be radially supported along their length. In particular cases, therefore it may be possible to dispense with the bearings 38, 40 and simply have the output shafts supported in an overhung manner from the propeller shaft bearings. On the input side of the transmission, a further radial bearing 42 is shown supporting the outer input shaft 4. The inner input shaft 2 is shown without radial bearings, to be supported in an overhung manner from the inner rotary element of the drive motor and it is possible to dispense with the bearing 42 if the outer shaft is similarly supported from the outer element of the motor. Alternatively both inner and outer input shafts can be radially supported by a bearing arrangement similar to the bearings 38, 40.

In FIG. 2, the contra-rotating elements MI, MO of the electric motor are shown and, as in the first example, the inner element MI is secured directly to the sunwheel of the epicyclic gear, but in this case through an outer, hollow input shaft 52. An inner input shaft 54 concentric with the shaft 52 extends through the motor and carries a flange plate 56 coupled to the outer element MO of the motor. The inner shaft 54 extends through the epicyclic gear of the transmission to be connected integrally with the inner output shaft 58.

Analogously to the outer input shaft of the first example, this inner shaft 54 is also integral with annulus 62 of the epicyclic gear, through a carrier 64. Also similar to the first example is the connection of the respective output shaft 58, 60 to the annulus 62 and planet carrier 66 of the epicyclic gear, but in this case it is the inner shaft 58 that is connected to the annulus 62 through the carrier 64 and the outer output shaft 60 that is connected through a cage 68 to the planet carrier 66 with its planet wheels 70.

Radial bearings 72, 74 are provided on the output shafts 58, 60 as before, to maintain their concentricity. Axial thrusts from the inner output shaft 58 are supported by thrust bearings 76 on an end flange 78 of the inner input shaft 54 on the side of the motor remote from the epicyclic gear. Axial thrusts on the outer output shaft 60 are supported independently by thrust bearings 80 on a flange 82 forming part of the planet-carrying cage 68 between the epicyclic gear and the drive motor. Stationary supports (not shown) are of course provided to react the forces on the radial and axial bearings.

As in the first example, the motor can be of conventional construction and therefore does need to be described in detail. It will be understood that the radial bearings it is provided with serve to maintain concentricity of the input shafts 52, 54 in this case, although independant radial support can be provided in the manner already described.

It can be seen that this second example is dynamically equivalent to the first example. It is therefore also self-balancing in the sense that no external net torque is developed.

The equal sharing of the output torque in these examples is dependent upon there also being an equal sharing of the input torque. Although such a system has advantages in that the installation does not have to be designed to resist reaction torque, there may be instances where it is required not to share the torque equally. Such a system may be established by altering the torque on one of the input elements through a supplementary drive or a brake.

Within the epicyclic gears of the examples, double helical gearing is employed to eliminate internal end thrusts. The planet gear wheels are preferably coupled to the annulus in the manner described in GB 2136084.

We claim:

1. A drive transmission for driving a pair of concentric, contra rotating propeller shafts wherein the improvement comprises a powered drive means having concentric, contra rotating elements, one of which is directly, coaxially coupled to one of said shafts, epicyclic gearing providing a coupling connection between the other element and the other of said shafts and wherein said concentric shafts are coupled together via planet gearing contained in said epicyclic gearing, so that equal load sharing is ensured between said concentric shafts.

2. A drive transmission for driving a pair of inner and outer, concentric, contra rotating propeller shafts wherein the improvement comprises a power drive means having inner and outer, concentric, contra rotating elements, said outer rotating element of said drive means being directly coupled to said inner propeller shaft and said outer propeller shaft being coupled to said inner rotating element of said drive means, said transmission including epicyclic gearing providing a coupling connection between said inner rotating element and said outer rotating element of said drive means, said epicyclic gear including a sun wheel, a drive shaft and planet gearing.

3. A drive transmission as claimed in claim 2 wherein said epicyclic gear includes an annulus gear and the propeller shafts are coupled together via the planet gearing and the annulus gear.

4. A drive transmission as claimed in claim 2 wherein the outer propeller shaft is directly coupled to the outer drive element and the inner shaft is coupled to the inner element via the planet gearing, the sunwheel and a drive shaft.

5. A drive transmission as claimed in claim 4 wherein said epicyclic gearing includes an annulus gear and the propeller shafts are coupled together via the annulus gear and the planet gearing.

6. A drive transmission as claimed in claim 1 wherein the drive elements comprise an electric motor.

7. A drive transmission as claimed in claim 3 wherein the drive elements comprise an electric motor.

8. A drive transmission as claimed in claim 5 wherein the drive elements comprise an electric motor.

* * * * *